(12) United States Patent
Stolfo et al.

(10) Patent No.: US 10,476,908 B2
(45) Date of Patent: Nov. 12, 2019

(54) GENERATING HIGHLY REALISTIC DECOY EMAIL AND DOCUMENTS

(71) Applicants: Salvatore J. Stolfo, New York, NY (US); Carl Sable, New York, NY (US)

(72) Inventors: Salvatore J. Stolfo, New York, NY (US); Carl Sable, New York, NY (US)

(73) Assignee: Allure Security Technology Inc., Waltham, MA (US)

( * ) Notice: Subject to any disclaimer, the term of this patent is extended or adjusted under 35 U.S.C. 154(b) by 608 days.

(21) Appl. No.: 15/233,563

(22) Filed: Aug. 10, 2016

(65) Prior Publication Data

US 2017/0104785 A1  Apr. 13, 2017

Related U.S. Application Data

(60) Provisional application No. 62/202,997, filed on Aug. 10, 2015.

(51) Int. Cl.
| | |
|---|---|
| *H04L 29/06* | (2006.01) |
| *G06F 17/27* | (2006.01) |
| *G06N 20/00* | (2019.01) |
| *G06F 17/22* | (2006.01) |
| *G06N 7/00* | (2006.01) |

(52) U.S. Cl.
CPC ...... *H04L 63/1491* (2013.01); *G06F 17/2264* (2013.01); *G06F 17/278* (2013.01); *G06N 7/005* (2013.01); *G06N 20/00* (2019.01)

(58) Field of Classification Search
CPC . H04L 63/1491; G06N 20/00; G06F 17/2264; G06F 17/278
See application file for complete search history.

(56) References Cited

U.S. PATENT DOCUMENTS

| | | | | |
|---|---|---|---|---|
| 7,516,492 | B1 * | 4/2009 | Nisbet | G06F 21/554 707/999.001 |
| 7,996,511 | B1 * | 8/2011 | Wiese | G06F 9/5072 709/223 |
| 8,918,311 | B1 * | 12/2014 | Johnson | G06F 17/271 704/9 |
| 2003/0182310 | A1 * | 9/2003 | Charnock | G06Q 10/10 |
| 2004/0049693 | A1 * | 3/2004 | Douglas | G06F 21/552 726/23 |
| 2004/0153994 | A1 * | 8/2004 | Bates | G06F 8/36 717/110 |
| 2009/0070459 | A1 * | 3/2009 | Cho | H04L 63/1416 709/224 |
| 2012/0254333 | A1 * | 10/2012 | Chandramouli | G06F 17/27 709/206 |
| 2016/0267905 | A1 * | 9/2016 | Levit | G10L 15/063 |

OTHER PUBLICATIONS

Sunkavalli et al., "Factored time-lapse video", SIGGRAPH '07 ACM, San Diego, California—Aug. 5-9, (Year: 2007).*

* cited by examiner

*Primary Examiner* — Morshed Mehedi
(74) *Attorney, Agent, or Firm* — Kelley Drye & Warren LLP

(57) ABSTRACT

A system that generates decoy emails and documents by automatically detecting concepts such as dates, times, people, and locations in e-mails and documents, and shifting those concepts. The system may also generate an email or document reciting a URL associated with a fake website and purported login credentials for the fake website. The system may send an alert to a user of the system when someone seeks to access the fake website.

20 Claims, 10 Drawing Sheets

```
required last first
first ken john
first kenneth johnny
middle l q
middle l. q.
middle lee quin
last lay public
```

```
{
    "From":  "susan.bailey@enron.com",
    "To":  "bailey-s@gmail.com",
    "Cc":  null,
    "Bcc":  null,
    "Subject":  "Reminder, new account",
    "Body":  "Created account at Personal Info Tracker\n\nhtt
ps://login.alluresecurity.com\n\nusername: bailey-s, pw: Am1s
QwVDijTsR8s\n",
    "HasAttachments":  false,
    "Id":  "SMFmPJJcWQUtYZE7PAKvXpUxSLK1DR18YGJnTYZnGvqdS2ZoS
fUjPPRVDVEASSDCxmOnKB8XVqzrNYcaf83GWsMshTkhAA6oFEXtUGO3d6BtEE
QGiBF1CRJ/iIVsqRhaYGgQ+FHGPps7VEWULS9XJVK=",
    "DateSent":  "Tuesday, July 4, 2000",
    "TimeSent":  "17:40:55"
}
```

FIG. 6

```
rags@rags-VirtualBox:~/rags$ python batch_process_json.py

Usage: python batch_process_json.py <corpus_dir> [Options]

<corpus_dir> is a required argument indicating the
folder containing all user directories.
<corpus_dir> can be indicated as an absolute or
relative path.

Options:
  -c, --chunker_file
      the pickled chunker to use for named entity recognition
  -d, --day_delta
      number of days to shift each e-mail
  -l, --log_file
      the name of the log file (default is log.txt)
  -m, --min_delta
      number of minutes to shift each e-mail
  -s, --sec_delta
      number of seconds to shift each e-mail
  -p, --pshift_file
      a file indicating a preson to shift rags@rags-VirtualBox:~/rags$
```

FIG. 7

```
rags@rags-VirtualBox:~/rags$ python batch_process_json.py corpus/enron_plus_mitre -d -
500 -m 630 -l log1.txt
-p KenLay.pshift -p DougGilbert-smith.pshift -p NatalieMcCarthy.pshift -p
WandaCurry.pshift -p CarlReiber.pshift
Analyzing corpus...
Found 8420 total .json files and 334 other non-attachment files
Processing all files.
Completed processing 100 e-mails plus non-attachment files.
Completed processing 200 e-mails plus non-attachment files.
Completed processing 300 e-mails plus non-attachment files.
```

FIG. 8

```
{
    "From": "no.address@enron.com",
    "To": null.
    "Cc": null.
    "Bcc": null.
    "Subject": "Holiday Party - Canceled"
    "Body": "\nI know that this is a difficult time
for all of us. With everything going on inside the
company as well as in the world around us, we have
been carefully considering whether a holiday
celebration is appropriate this year. To be honest,
employee feedback has been mixed. Many viewed the
holiday party as a unique opportunity for us to come
together as Enron employees to share the spirit of
the season. Others felt a holiday party would be
improper given the company's current circumstances.
\n\nAfter weighing these points of view, we have
ultimately decided to cancel the all-Enron holiday
party that was scheduled for December 8. Given what
has transpired ever the past month, it could be
considered imprudent for Enron to incur the expense
of such an event. I regret that this action is
necessary because I recognize that your hard work
throughout the year merits a holiday celebration and
so much more. We will attempt to find other, more
appropriate ways to recognize your outstanding
contributions as we move into the holiday season.
\n\n Ken Lay ,
"HasAttachments": false,
"Id":"LFGjuTVqNCQsSKP6CUFpRaXeMSN3RA31FXYpECSzBil
sL5PHOYYgWEGFDUZMDPOIeaMjLQ308qcsVKitw25QZwOqfFavEG8
gVDYjFMC3r6UuXQDXJSY60MA/tHHqzMehRPgm+EDSUrn4XUAPGN7
2IWM=".
"DateSent": Monday, November 19, 2001 ,
"TimeSent": 13:34:59
}
```

```
{
    "From": "no.address@enron.com",
    "To": null.
    "Cc": null.
    "Bcc": null.
    "Subject": "Holiday Party - Canceled"
    "Body": "\nI know that this is a difficult time
for all of us. With everything going on inside the
company as well as in the world around us, we have
been carefully considering whether a holiday
celebration is appropriate this year. To be honest,
employee feedback has been mixed. Many viewed the
holiday party as a unique opportunity for us to come
together as Enron employees to share the spirit of
the season. Others felt a holiday party would be
improper given the company's current circumstances.
\n\nAfter weighing these points of view, we have
ultimately decided to cancel the all-Enron holiday
party that was scheduled for July 26. Given what
has transpired ever the past month, it could be
considered imprudent for Enron to incur the expense
of such an event. I regret that this action is
necessary because I recognize that your hard work
throughout the year merits a holiday celebration and
so much more. We will attempt to find other, more
appropriate ways to recognize your outstanding
contributions as we move into the holiday season.
\n\n John Public ,
"HasAttachments": false,
"Id":"LFGjuTVqNCQsSKP6CUFpRaXeMSN3RA31FXYpECSzBil
sL5PHOYYgWEGFDUZMDPOIeaMjLQ308qcsVKitw25QZwOqfFavEG8
gVDYjFMC3r6UuXQDXJSY60MA/tHHqzMehRPgm+EDSUrn4XUAPGN7
2IWM=".
"DateSent": Friday, July 7, 2000 ,
"TimeSent": 00:04:59
}
```

FIG. 9

```
rags@rags-VirtualBox:~/rags$ ../../json_diff.py ../Email/deleted_items_374.json deleted_items_374.json
Values of text field Body differ.
--- ../Email/deleted_items_374.json
+++ deleted_items_374.json
@@ -4 +4 @@
-After weighing these points of view, we have ultimately decided to cancel the all-Enron
holiday party that was scheduled for December 8.  Given what has transpired over the past month,
it could be considered imprudent for Enron to incur the expense of such an event.  I regret that
this action is necessary because I recognize that your hard work throughout the year merits a
holiday celebration and so much more. We will attempt to find other, more appropriate ways to
recognize your outstanding contributions as we move into the holiday season.
+After weighing these points of view, we have ultimately decided to cancel the all-Enron
holiday party that was scheduled for July 26.  Given what has transpired over the past month, it
could be considered imprudent for Enron to incur the expense of such an event.  I regret that
this action is necessary because I recognize that your hard work throughout the year merits a
holiday celebration and so much more. We will attempt to find other, more appropriate ways to
recognize your outstanding contributions as we move into the holiday season.
@@ -6 +6 @@
-Ken Lay
+John Public
Values of text field DateSent differ.
--- ../Email/deleted_items_374.json
+++ deleted_items_374.json
@@ -1 +1 @@
-Monday, November 19, 2001
+Friday, July 7, 2000
Values of text field TimeSent differ.
--- ../Email/deleted_items_374.json
+++ deleted_items_374.json
@@ -1 +1 @@
-13:34:59
+00:04:59
```

FIG. 10

3)What was the volume missing? 300K barrels (per EGM). - total positions were 5.3 BBL for Thursday trading - approximately 6% - a bit more material -----Original Message-----
From: Beck, Sally
Sent: Monday, October 15, 2001 12:53 PM
To: Price, Brent A.; Wilson, Shona
Subject: FW: ERMS books not getting into RisktRAC What's the story on this one? Who can best answer the four questions posed by Wanda? How soon can we have answers? Interestingly, I have a 4:00 PM meeting today with Rick Buy, David Port, Wanda Curry, Bill Bradford and Debbie Brackett (rescheduled from last Friday re: Project Greenlight, due to Buy's schedule). I would like to be more informed than they are at 4:00. Thanks -Sally -----Original Message-----
From: Curry, Wanda
Sent: Monday, October 15, 2001 10:05 AM
To: Beck, Sally
Subject: FW: ERMS books not getting into RisktRAC 19)What was the volume missing? 300K barrels (per EGM). - total positions were 5.3 BBL for Monday's trading - approximately 6% - a bit more material -----Original Message-----
From: Beck, Sally
Sent: Friday, June 2, 2000 11:23 PM
To: Price, Brent A.; Wilson, Shona
Subject: FW: ERMS books not getting into RisktRAC What's the story on this one? Who can best answer the four questions posed by Melanie? How soon can we have answers? Interestingly, I have a 2:30 AM meeting today with Rick Buy, David Port, Wanda Curry, Bill Bradford and Debbie Brackett (rescheduled from last Tuesday re: Project Greenlight, due to Buy's schedule). I would like to be more informed than they are at 4:00. Thanks -Sally -----Original Message-----
From: Curtis, Melanie
Sent: Friday, June 2, 2000 8:35 PM
To: Beck, Sally
Subject: FW: ERMS books not getting into RisktRAC

FIG. 11

| Approved for Public Release; Distribution Unlimited  Case #09-3078 | ©The MITRE Corporation. All rights reserved  Spotlight_Reiber_ver4_July 28  Written by Kay M. Upham  Ver 4 by C. Reiber |
|---|---|

Word Count: 719
Interviewee: Carl Reiber
Working Tide: Supporting Naval Aviation from Lexington Park With projects such as airborne networking, antisubmarine warfare, intelligence collection reconnaissance aircraft, and the Navy's unmanned combat air system, MITRE's Carl Reiber and the Naval Aviation Systems Department support their sponsor, the Naval Air Systems Command (NAVAIR) and associated Program Executive Offices at the company's Lexington Park, Md., site.

"When I first came to MITRE in 2003, I was working on an assortment of Navy projects here in Lexington Park," says Reiber. "Sometime thereafter, I was asked to form MITRE's Naval Aviation Systems Department. Our group has grown significantly since then and our impact has expanded dramatically. Our staff consistently provides special value to our customers judged by the annual survey we do."

Reiber attributes this growth in part to aligning the department to meet the customer's needs. "I've always felt that you need to pay close attention to meeting the needs of the customer," he says. "You can't be locked down in thinking about the way things have always been. You should be focused on the way things need to be."

He continues, "Clearly, our priority is to support our Naval Aviation sponsor, NAVAIR. We're involved with a number of different Navy programs and our work encompasses a wide variety of technical areas including unmanned vehicles, airborne networking, netted sensors, Mission Assurance, C2 [command and control], communications, system engineering, multi-mission helicopters, anti-submarine warfare, and research and acquisition guidance. Many of our projects rely on staff here in Lexington Park but we also work with staff from many other MITRE locations, including McLean [Va.], Bedford [Mass.], San Diego, and Quantico [Va.], to name a few."

A Special Interest in Unmanned Aviation

FIG. 12A

Approved for Public Release; Distribution Unlimited
Case #09-3078

©The MITRE Corporation. All rights reserved
Spotlight_Reiber_ver4_July 28
Written by Kay M. Upham
Ver 4 by D. Hunt Word Count: 719
Interviewee: Derek Hunt
Working Tide: Supporting Naval Aviation from Lexington Park With projects such as airborne networking, antisubmarine warfare, intelligence collection reconnaissance aircraft, and the Navy's unmanned combat air system, MITRE's Derek Hunt and the Naval Aviation Systems Department support their sponsor, the Naval Air Systems Command (NAVAIR) and associated Program Executive Offices at the company's Lexington Park, Md., site.

"When I first came to MITRE in 2001, I was working on an assortment of Navy projects here in Lexington Park," says Reiber. "Sometime thereafter, I was asked to form MITRE's Naval Aviation Systems Department. Our group has grown significantly since then and our impact has expanded dramatically. Our staff consistently provides special value to our customers judged by the annual survey we do."

Hunt attributes this growth in part to aligning the department to meet the customer's needs. "I've always felt that you need to pay close attention to meeting the needs of the customer," he says. "You can't be locked down in thinking about the way things have always been. You should be focused on the way things need to be."

He continues, "Clearly, our priority is to support our Naval Aviation sponsor, NAVAIR. We're involved with a number of different Navy programs and our work encompasses a wide variety of technical areas including unmanned vehicles, airborne networking, netted sensors, Mission Assurance, C2 [command and control], communications, system engineering, multi-mission helicopters, anti-submarine warfare, and research and acquisition guidance. Many of our projects rely on staff here in Lexington Park but we also work with staff from many other MITRE locations, including McLean [Va.], Bedford [Mass.], San Diego, and Quantico [Va.], to name a few."

A Special Interest in Unmanned Aviation

A retired Naval Flight Officer, Reiber has a broad range of experience from his years flying operationally, as a chief test pilot, and as a program manager in research, development, and acquisitions for weapons. Since coming to MIRE, Hunt has also become an integral part of

FIG. 12B

GENERATING HIGHLY REALISTIC DECOY EMAIL AND DOCUMENTS

BACKGROUND

The systems and methods of the present invention may be used to detect and thwart hackers or other unauthorized users of computer systems.

SUMMARY OF INVENTION

The system may process e-mails in .json format plus attachments and standalone files within directory structures matching certain specifications. E-mails and files may be processed one user at a time, in sorted order according to timestamps. Within each e-mail or file, dates and times may be detected and shifted according to user-specified deltas, and people's names are detected and shifted according to user-provided templates Formatting may be preserved exactly for .docx files and approximately for .pdf files. Text files and html-formatted e-mails may also be handled similarly. The accuracy achieved for detecting recognized concepts may be high, based on a Bayesian machine learning algorithm for named entity recognition followed by a second phase to exclude false positives. During processing, fake e-mails including enticing content may be occasionally inserted to lure an unauthorized user to reveal themselves by visiting a fake website and entering generated credentials. The system may also be converted to a daemon that runs in the background and automatically detects and processes new users, e-mails, or files as they appear.

BRIEF DESCRIPTION OF THE DRAWINGS

A further understanding of the invention can be obtained by reference to the illustrations of the accompanying drawings. Both the organization and method of operation of the invention, in general, together with further objectives and advantages thereof, may be more easily understood by reference to the drawings and the following description. The drawings are not intended to limit the scope of this invention, which is set forth with particularity in the claims as appended hereto or as subsequently amended, but merely to clarify and exemplify the invention.

FIG. 2 depicts a screenshot in accordance with an embodiment of the invention;

FIG. 3 depicts a screenshot in accordance with an embodiment of the invention;

FIG. 6 depicts an e-mail generated in accordance with an embodiment of the invention;

FIG. 7 depicts a screenshot in accordance with an embodiment of the invention;

FIG. 8 depicts a screenshot in accordance with an embodiment of the invention;

FIG. 9 depicts an original email and the email modified in accordance with an embodiment of the invention;

FIG. 10 depicts a screenshot in accordance with an embodiment of the invention;

FIG. 11 depicts an excerpt from a .docx file and the excerpt modified in accordance with an embodiment of the invention; and FIGS. 12A and 12B depict an excerpt from a .pdf file (FIG. 12A) and the excerpt modified in accordance with an embodiment of the invention (FIG. 12B).

DETAILED DESCRIPTION OF THE INVENTION

Figure 1:
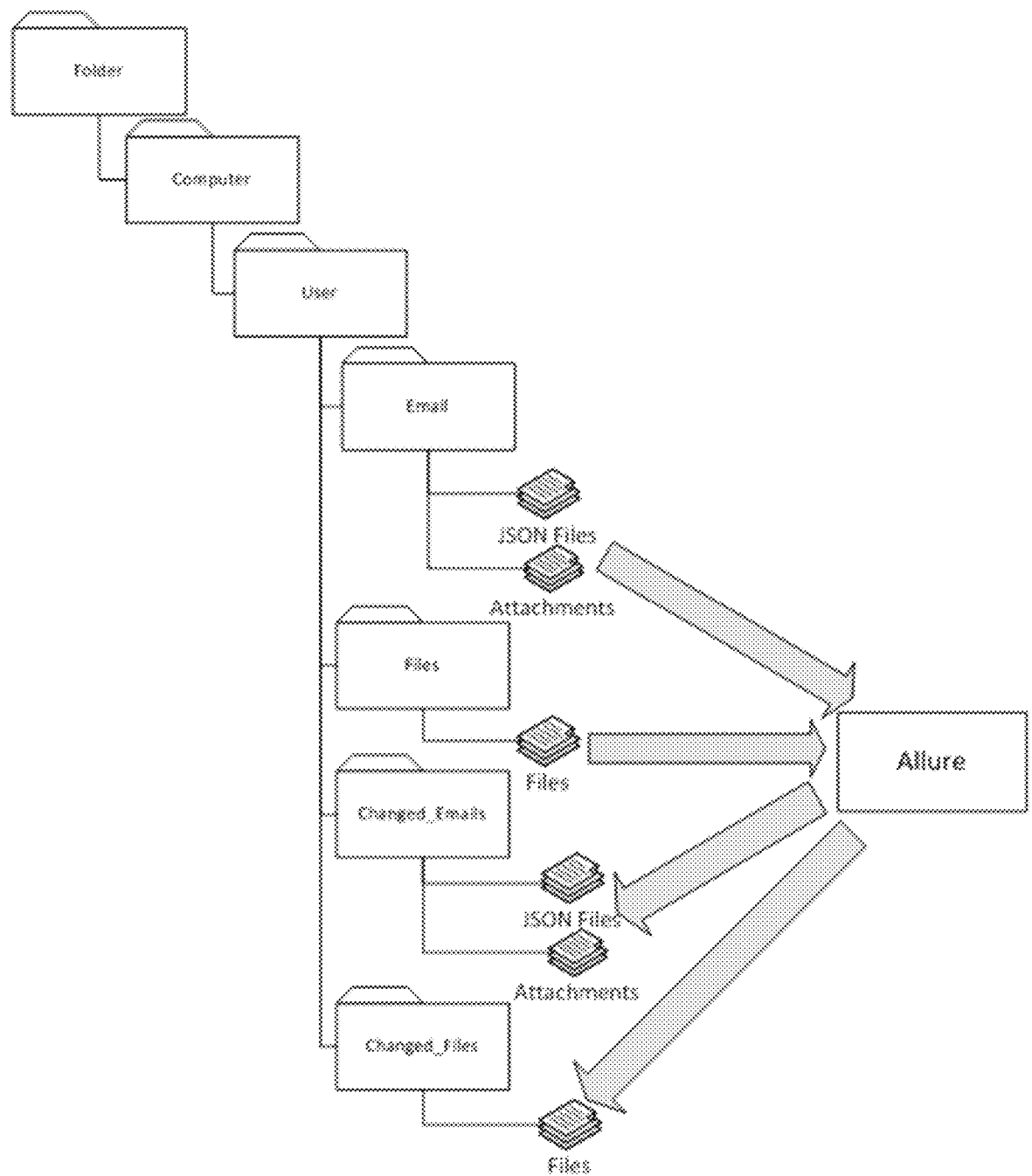
FIG. 1 depicts a directory structure in accordance with an embodiment of the invention.

The Decoy Generating System ("DGS" or "RAGS") of the present invention processes e-mails along with their attachments and other user files in one user directory at a time. The user directories may exist within a specified base directory that is provided to the system. Each user directory may contain a subdirectory called "Email" containing e-mails and (as separate files) attachments; another subdirectory called "Files" may contain other user files. Processed (i.e., shifted) e-mails may be placed in a subdirectory called "Changed_Emails," and processed files may be placed in a subdirectory called "Changed_Files." This is summarized in FIG. 1. The DGS system may be implemented in Python and may make extensive use of the Natural Language Toolkit (NLTK), a popular platform for building Python applications that process natural language.

All e-mails may be stored in .json format. When the DGS system processes e-mails and files, it may detect dates and times, and shift them according to deltas specified by the user. The current state of the system may also detect people and shift them according to templates specified by the user. Other areas of investigation include the detection of other nouns including locations and organizations.

The system may process one user directory at a time, and within each user directory, the system may process e-mails and files in sorted order according to their timestamps. The system may randomly insert a fake e-mail including enticing content. The content may include the URL of a fake website and login credentials for the website. The user may be alerted, for example via e-mail, if anyone tries to log in to the fake website using credentials associated with the user's account. The system may also run as a daemon that can detect when new user directories, e-mails, or files are added or created, and process them automatically at such times.

A. Training the DGS System

The system may automatically detect concepts including dates, times, people, and locations in e-mails and files, using an approach known as named entity recognition. A "chunker" predicts a category for every token (i.e., word) in a document using a Bayesian machine learning algorithm. Each token may begin a concept (e.g., label B-PERSON), continue a concept (e.g., label I-PERSON), or not be part of any recognized concept (label O). General features used for learning include the token itself, the token's part-of-speech, the next and previous token and part-of-speech (POS), and the previous token's label. Several concept-specific features have been added to improve accuracy (e.g., Boolean features representing the inclusion, or not, in lists of months, lists of names according to the U.S. Census Bureau, etc.). A second phase using hand-crafted rules is applied to eliminate some false positives. For example, predicted dates are excluded if they are not verified by Python's dateutil module, and names of people are excluded if they contain '@', since these are probably e-mail addresses.

The chunker is trained on files that have had instances of each relevant concept manually labeled. A sample training corpus may consists of 94 news documents from the publicly available Information Extraction: Entity Recognition (LEER) corpus, and 100 randomly selected e-mails from the Enron e-mail dataset. Cross-validation experiments may be performed within the training set to evaluate the chunker's accuracy detecting dates, times, and people using standard metrics from the field of natural language processing (NLP). The metrics used may include recall, which indicates the percentage of actual tokens from the category that are correctly predicted to belong to the category; precision, which indicates the percentage of predicted tokens assigned to the category that actually do belong to the category; and F1, which combines recall and precision into a single metric that is closer to the lower of the two. Based on cross-validation experiments, it is possible for the system to achieve F1 scores for dates averaging about 94%, F1 scores for times averaging about 91%, and F1 scores for people averaging about 70%.

A typical user should never need to retrain the chunker. However, the system allows the user to train their own chunker, and to specify that chunker to be used by the system in place of a default chunker (which, for example, may have been trained using the training set and methodology indicated above). A graphical user interface may be implemented and shall be referred to herein as the Named Entity Labeler. In the NLP literature, the term "named entity" is used to represent the concepts that are detected by this sort of approach, including concepts such as dates, times, etc.

Figures 2, 3:
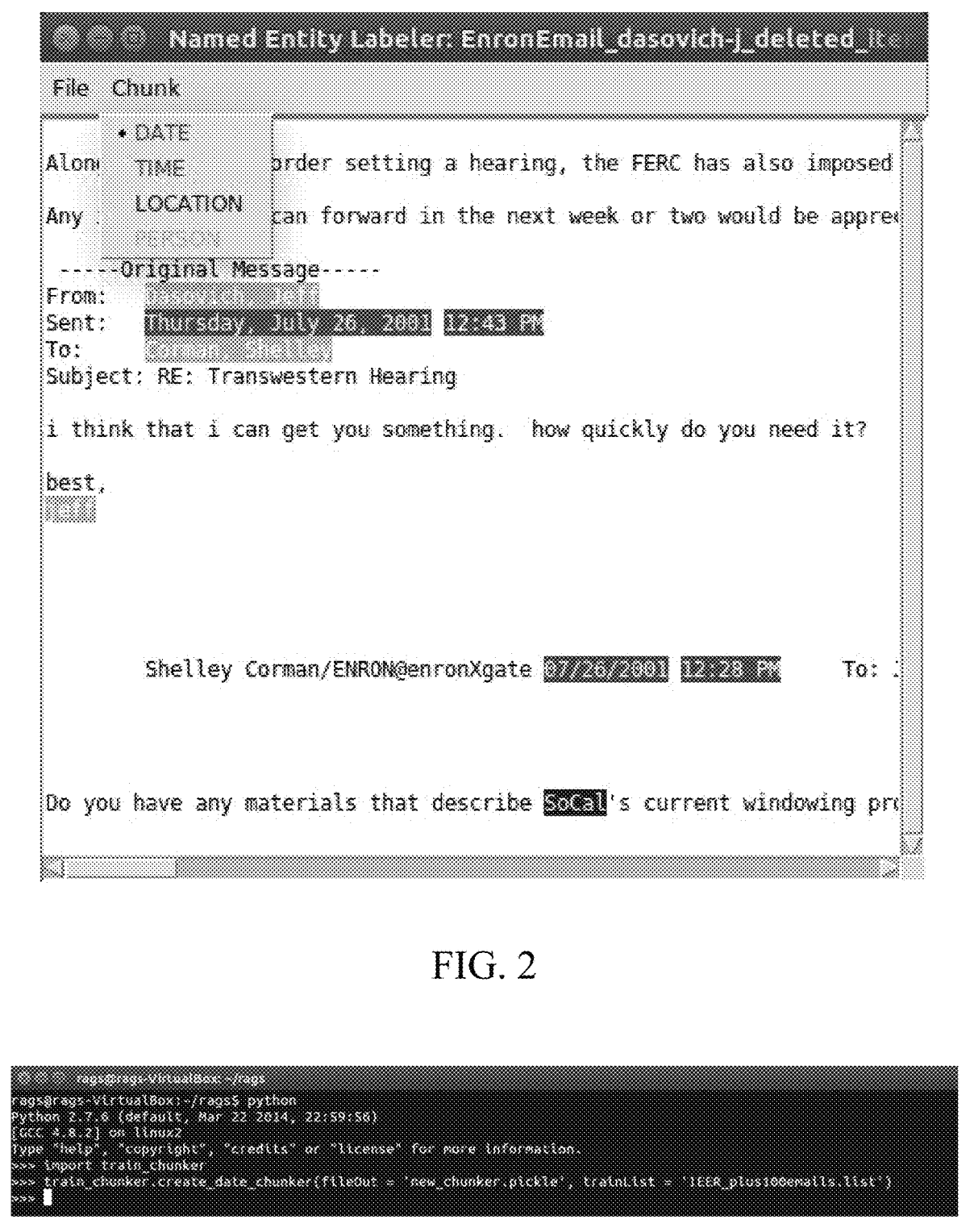

A screenshot of our Named Entity Labeler being used to label one of the e-mails in a training set is shown in FIG. 2. The user can select the type of chunk from a "Chunk" menu, and then select portions of text that match that chunk. The user may click the left button of a computer mouse to label a selection as an example of the chunk, and the graphical user interface (GUI) may automatically expand the selection to make sure it includes complete tokens. The user may click the right button of a computer mouse to select a previously labeled chunk to delete the label. When the user saves the file, the file may be saved in two formats. One format may have the extension .nel, and comprise a text file with metadata that the GUI uses to indicate current labels. Another format may be a .train file, which has the appropriate format for training the chunker.

Once enough documents have been labeled to constitute a training set, a user can train a chunker using a Python script. This can easily be performed from the interactive Python shell. FIG. 3 shows a screenshot of part of a computer screen indicating how the chunker may be trained. The first parameter indicates the name to give a pickled chunker, wherein "pickling" is how Python applications typically implement object serialization. The second parameter is a text file that contains the full paths and filenames of documents to be used for training. The applied function disclosed in FIG. 3, "create_date_chunker," may be used to recognize dates. In the alternative, the function may create a chunker that is capable of predicting all concepts labeled in the training files. On a typical machine, the entire training process may take only a few seconds. Additional Python scripts may be implemented to perform cross-validation experiments within the training set to automatically compute and display evaluation metrics for all concepts (not shown here).

B. Detecting and Shifting Concepts

When the DGS system processes e-mails, attachments, or other files, it may first extract the textual content from the document, then segment the text into sentences, then tokenizes each sentence (i.e., split the sentence into words plus important punctuation), then compute the part-of-speech (i.e., syntactic category) for each token, then compute other features used for learning, then apply the chunker to detect recognized concepts (e.g., dates, times, names of people, locations). For each predicted concept, a second phase may be applied to eliminate false positives. Then each date and time may be shifted according to deltas specified by the user (this makes use of Python's datetime module). Matching .pshift files provided by the user may also be modified according to user-provided templates as explained below. After all shifts are applied, the document may be reconstructed and saved in the proper destination folder. A simplified outline explaining the system workflow for processing a single e-mail or file is shown in FIG. 4.

Retrieving the text from a file, represented by the first box in the outline, may be more complicated for some file types than others. For e-mails represented as .json files, the Python json module can be used to obtain and potentially modify the various fields. Text files are also simple to deal with. The system may handle HTML-formatted e-mails (and other .html files, if any), .docx attachments and files, and .pdf attachments and files. Handling HTML and .docx files are similar, because .docx files are stored as compressed XML documents, and specific tags indicate textual fields; Python's lxml module is useful for handling both formats. Complications can still arise as sentences may be split between HTML or XML nodes. The system may restore all modified tokens to their original nodes to preserve formatting. It is difficult, however, to manipulate .pdf files directly. The system may therefore rely on publically available utilities to convert .pdf files to .html, process the .html, and convert the file back to pdf. The conversion is not perfect, so formatting of .pdf files is only approximately preserved. Any other file type, either as an attachment or standalone file, is copied to the destination directory unmodified.

Shifting dates and times, once predicted and verified, may be achieved using Python's datetime module (examples are described below). To specify names of people to shift, and how to shift them, the user can specify one or more templates in the form of .pshift files. Each template specifies a person to shift, if detected, and how to shift the person. Each template must include: (1) All allowable variations of the person's first name, middle name, and last name; (2) How each allowable variation of any part of a name should be modified; and (3) Which parts of the person's name is required to count as a match.

Figures 4, 5:
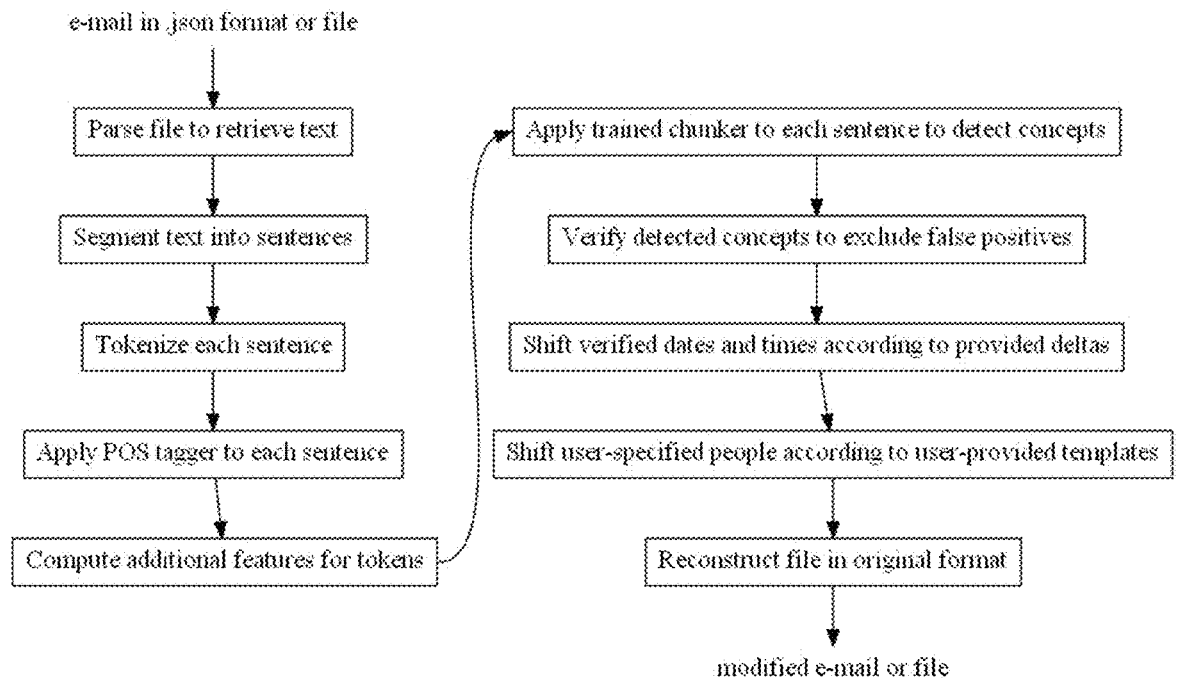
FIG. 4 depicts a flowchart for processing an e-mail or file according to an embodiment of the invention.
FIG. 5 depicts an example of a .pshift file according to an embodiment of the invention.

An example of a .pshift file specifying rules for shifting variations of the name Ken Lay is shown in FIG. 5. Note that to be considered a match for this template, a detected name predicted by the chunker must match at least the first and last name as specified in the template. Matches for the middle name are allowed but not required (but a middle name that is present and does not match the template would exclude the match). When the template is matched, each part of the name would be shifted as indicated in the template. Templates may be case insensitive and flexible with respect to whitespace. The system may attempt to use the same style of capitalization for shifted tokens as for original tokens. Therefore, in the example embodiment shown in FIG. 5, "Ken Lay" would become "John Public", "KENNETH L. LAY" would become "JOHNNY Q. PUBLIC", "Lay, Kenneth Lee" would become "Public, Johnny Quin", etc. Names such as "Ken" or "Lay" by themselves would not be shifted, since they do not match all required fields according to the first row of the template. Also, a name such as "Ken A. Lay" would not be shifted, since the middle initial "A" does not match the allowable middle names in the template, even though that field is not required.

C. Generating Fake E-Mails

At random points with configurable frequencies, believable fake e-mails are generated and inserted into a user's destination e-mail directory. The system may be limited to at most one fake e-mail generated per user. The content of the fake e-mails is based on configurable templates, and each template is applied at most once during a single run of the DGS system. Each generated fake e-mail may contain fake credentials. The fake e-mails are designed to entice a hacker who steals data into using the fake credentials at a fake website. Victims are automatically notified via e-mail when fake credentials have been used, indicating that their data has been stolen.

FIG. 6 shows the content of one fake e-mail generated. The general format of the file is son, matching the format of original e-mails as specified by BAE. Each template may be different. In the example shown in FIG. 6, the "From" field has been taken from a real e-mail of the same user; the "To" field contains a fake Gmail address based on the user's username; the body is mostly fixed, except for the username and password. The values of the "Cc" and "Bcc" fields may be predetermined as null; the value of the "HasAttachments" field may be predetermined as false; the value of the "Id" field is a randomly modified version of an id from a real e-mail; and the values of the "DateSent" and "TimeSent" fields may be computed as random offsets from the corresponding fields from a real e-mail of the same user (after the real e-mail has been shifted).

D. Running the DGS System

To run the system, the user may be required to specify the base directory within which all user directories reside. Additionally, the user may specify various optional parameters. If the user specifies a command with an incorrect format, a message may be displayed, such as the example screenshot depicted in FIG. 7. The "−c" option may enable the user to train and apply their own chunker (instead of a pre-trained chunker) as explained earlier. The other options could allow the user to specify deltas for shifting times and dates, to specify one or more .pshift files for shifting detected people, and to specify the name of the log file that is produced while the system is running.

The system has been tested on a corpus consisting of: (1) A subset of the Enron E-mail Dataset including 8,419 e-mails from 20 users, all converted to the proper .json format; (2) 215 .docx and .pdf files from the MITRE corpus; these MITRE files have been randomly scattered across user file folders and randomly added as attachments to e-mails; (3) 118 .txt files, representing the MITRE .pdf files converted to text (these are Unicode text files), plus one additional manually created ASCII .txt file; these .txt files were randomly scattered across user file folders (but these are not used as attachments); and (4) one additional complex .json file, including complex, formatted attachments and a .json field with an HTML-formatted body. Also included were five .pshift files. Assuming that the test corpus is placed in the directory "corpus/enron_plus_mitre" relative to the main system, a test run using all of the provided .pshift files, with specified deltas of −500 days and +630 minutes, can be run as follows: python batch_process son.py corpus/enron_plus_mitre-d-500-m 630-1 log1.txt-p KenLay.pshift-p DougGilbert-smith.pshift-p NatalieMcCarthy.pshift-p WandaCuny.pshift-p CarlReiber.pshift FIG. 8 shows a sample screenshot part way through one test run of the system. The user may be updated after every 100 e-mails and non-attachment files have been processed. The log file (not shown here), which can be examined as the system is running or afterward, may contain much more detailed information. The system may terminate after all e-mails and files have been processed. In the alternative, the a daemon may be run in the background and automatically process new users, e-mails, or files whenever they appear.

In addition to the required and optional command line arguments, the user may also configure many different aspects of the system through a configuration file. These configurable properties may include: (1) The default name of the log file; (2) The names of the subdirectories for original and modified files and e-mails in the corpus; (3) The expected fields in the .json files; (4) The probabilities determining how often fake e-mails are randomly generated; (5) The content of the templates for generating fake e-mails; (6) The range of random offsets from the base e-mails for timestamps of fake e-mails; (7) Whether or not to delete original e-mails and files after the modified versions have been created; and (8) the user information for the user running the system, so they may be notified when an unauthorized user has been lured to a fake website. In general, these properties tend to be more technical properties that are not likely to change frequently between runs of the system.

E. Examining System Output

FIG. 9 shows an example e-mail from the test corpus in its original .json format (left) and after being modified by the system using the example command shown earlier (right). Note that in this particular case, the body of the e-mail contained one date, which was detected and shifted, and one name that matched our example "KenLay.pshift" file (shown earlier), which was also detected and modified. Additionally, the "DateSent" and "TimeSent" fields of the e-mail were shifted.

The system may include a json_diff utility, written in Python and runnable from the command line, which displays the differences between two specified .json files in a diff-like format. FIG. 10 shows a screenshot displaying the output of the json_diff utility used to compare the original and modified .json files displayed in FIG. 9.

To compare modified .docx files or .pdf files with the corresponding originals, the user may need to open both files and compare them by eye. Of course, for these file types, we are interested not only in the content that has changed, but also in ensuring that the formatting has stayed the same, or has changed in an acceptable manner.

FIG. 11 shows an excerpt from a .docx file from the test corpus in its original state (left) and after being processed by the sample command shown earlier (right). This particular .docx file was one of the attachments for our complex .json file; the body contains the text of an e-mail from the Enron dataset, formatted in in variety of ways. Two dates were detected and modified where they appear in the document. In addition, the used .pshift file indicates that the name "Wanda Curry" should change to the name "Melanie Curtis", and that only the first name is required for a match. The name was detected in two locations in this excerpt, but missed in a third location.

FIGS. 12A and 12B show an excerpt from a .pdf file in the test corpus in its original state (FIG. 12A) and after being processed by the sample command shown earlier (FIG. 12B). This particular document came from the MITRE corpus. Examining closely, one can see that in this excerpt, there was just a single date (specifying a year), and it was correctly detected and shifted. In addition, one of the .pshift files that we have been using for testing indicates that the name "Carl Reiber" should be changed to "Derek Hunt," that only the last name is required, and the first name can be represented with just the initial "C." In this excerpt, five instances of the name were detected and modified, and two instances were missed. The token near the top of the document, "Spotlight_Reiber_ver4 July28" may contain a name and date within a larger, single token; our system will not be able to identify concepts that occupy only a part of a larger token). The modified document looks similar to the original and completely reasonable. As explained earlier, formatting of .pdf files is only approximately maintained. Note also that metadata about the document, such as the title that appears in the title bar, is preserved.

Various other modifications will be obvious to a person of skill in the art without deviating from the inventions claimed herein.

What is claimed is:

1. A method for generating a decoy electronic document comprising:
   receiving a file that includes at least one email or other electronic document,
   parsing the file to retrieve text,
   segmenting the text into sentences,
   tokenizing each sentence into a plurality of tokens,
   applying parts-of-speech analysis to each sentence,
   computing additional features for the tokens,
   applying a previously trained chunker to each sentence to detect concepts,
   verifying the detected concepts to exclude false positives,
   shifting the verified dates and times by user specified amounts, and
   reconstructing the file in its original format with the shifted dates and times.

2. The method of claim 1 further comprising the step of shifting user-specified people according to a user-provided template.

3. The method of claim 1 further comprising the step of shifting user-specified locations according to user-provided templates.

4. The method of claim 1 further comprising the step of shifting user-specified organizations according to user-provided templates.

5. The method of claim 1 further comprising the step of shifting header information in the same way date and time information is shifted.

6. The method of claim 1 wherein the concepts comprise a date.

7. The method of claim 6 further comprising the step of shifting user-specified people according to a user-provided template.

8. The method of claim 6 further comprising the step of shifting user-specified locations according to user-provided templates.

9. The method of claim 6 further comprising the step of shifting user-specified organizations according to user-provided templates.

10. The method of claim 6 further comprising the step of shifting header information in the same way date and time information is shifted.

11. The method of claim 6 wherein the concepts further comprise a time.

12. The method of claim 11 further comprising the step of shifting user-specified people according to a user-provided template.

13. The method of claim 11 further comprising the step of shifting user-specified locations according to user-provided templates.

14. The method of claim 11 further comprising the step of shifting user-specified organizations according to user-provided templates.

15. The method of claim 11 further comprising the step of shifting header information in the same way date and time information is shifted.

16. The method of claim 1 wherein the concepts comprise a time.

17. The method of claim 16 further comprising the step of shifting user-specified people according to a user-provided template.

18. The method of claim 16 further comprising the step of shifting user-specified locations according to user-provided templates.

19. The method of claim 16 further comprising the step of shifting user-specified organizations according to user-provided templates.

20. The method of claim 16 further comprising the step of shifting header information in the same way date and time information is shifted.

* * * * *